April 8, 1969
C. L. WELLONS
3,437,324
DIRECT FIRED WASTE WOOD DRYING APPARATUS AND METHOD
Filed July 27, 1967
Sheet 1 of 3
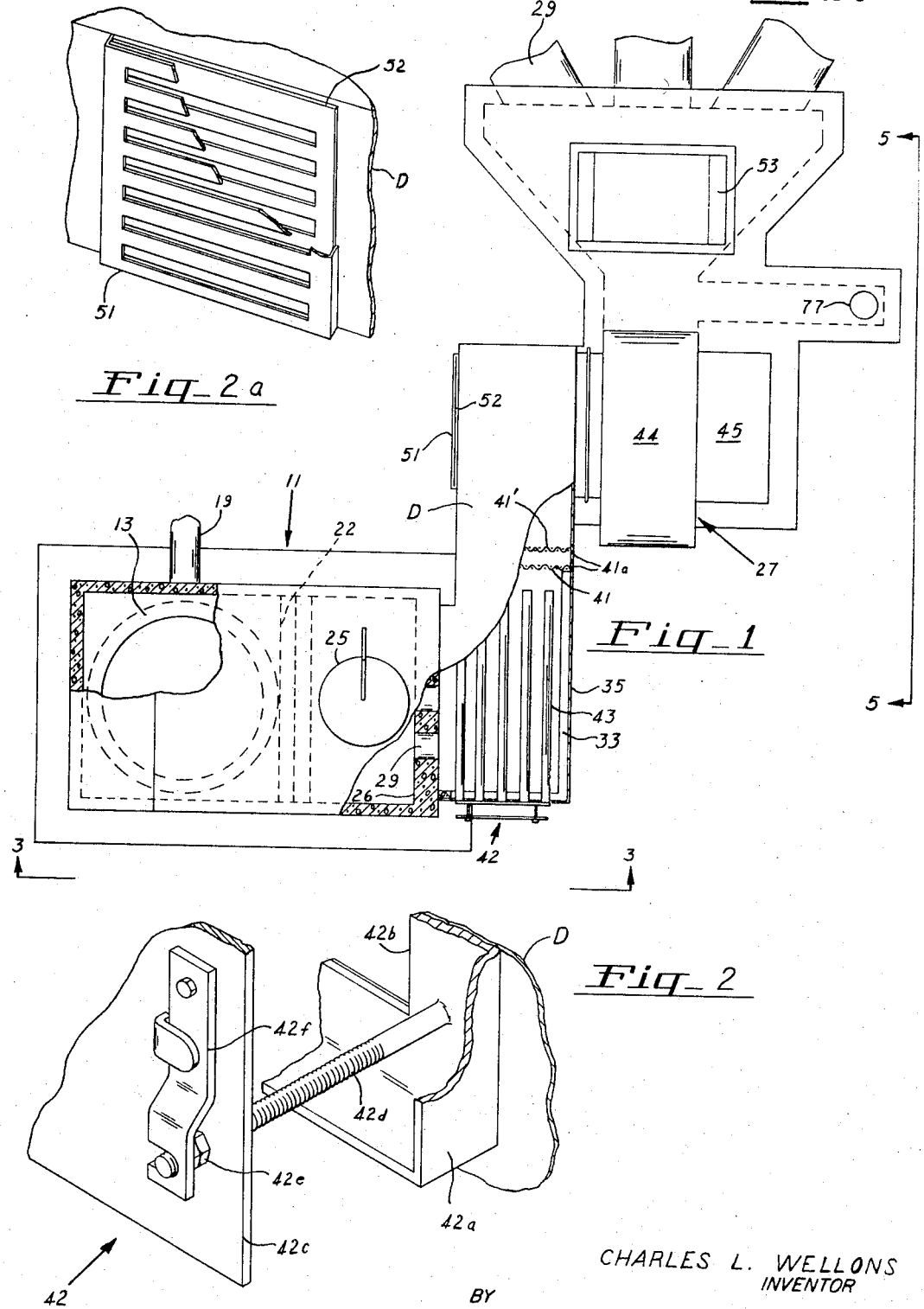
CHARLES L. WELLONS
INVENTOR
BY
BUCKHORN, BLORE, KLARQUIST & SPARKMAN
ATTORNEYS

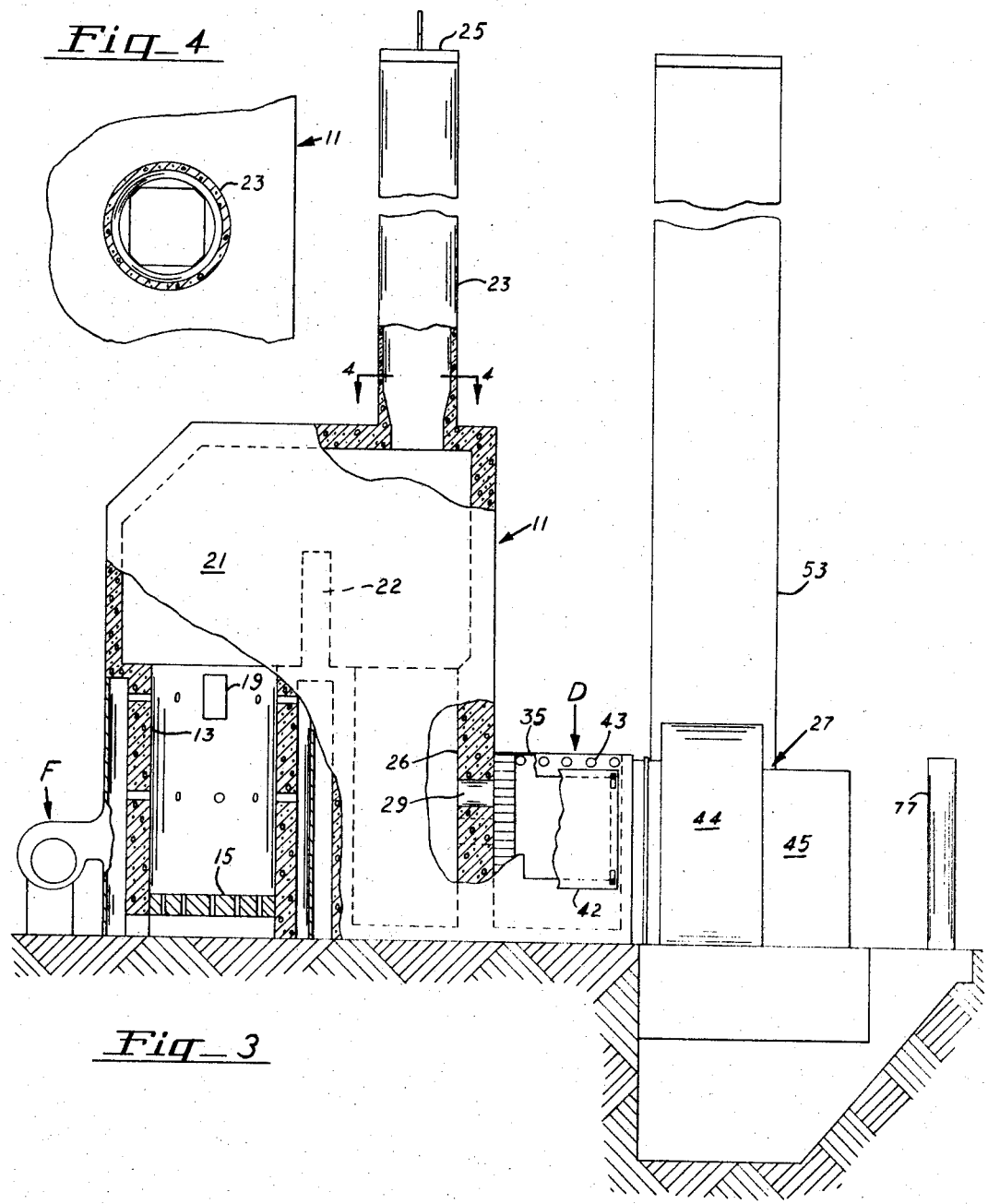

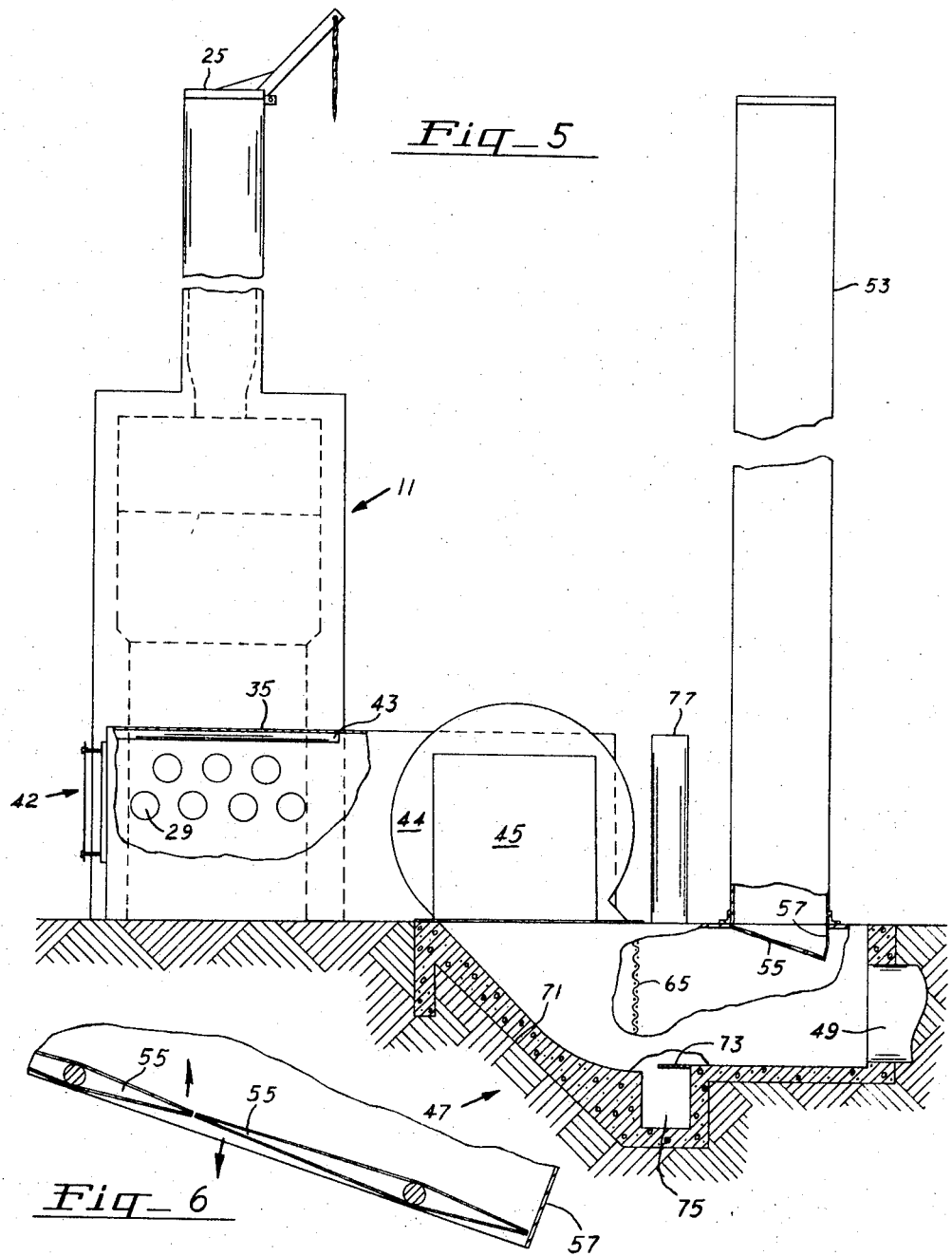

United States Patent Office 3,437,324
Patented Apr. 8, 1969

3,437,324
DIRECT FIRED WASTE WOOD DRYING APPARATUS AND METHOD
Charles L. Wellons, 951 7th Ave.,
West Linn, Oreg. 97068
Filed July 27, 1967, Ser. No. 656,477
Int. Cl. F23l 9/04; F23b 1/38, 1/28
U.S. Cl. 263—19                          3 Claims

ABSTRACT OF THE DISCLOSURE

A method and apparatus whereby waste wood fuel is burned in a furnace to create products of combustion and wherein said combustion products are so handled subsequently that the solid unburned particles therein are removed and the temperature thereof regulated at least in part by blending the same with ambient air so that said blended combustion products can be conducted directly into a drying kiln or similar drying chamber for drying the material therein.

BACKGROUND OF THE INVENTION

Field of the invention and prior art

This invention relates to methods and apparatus for providing a source of hot gas to be used for drying material in a drying kiln. At present, this source of hot gas can be conducted directly from the furnace, in the event the furnace is fired by natural gas or even oil, but where the fuel is waste wood or scrap wood, a heat exchanger must be employed with the attendant expense thereof.

Summary of the invention

The inventive apparatus and method of the present invention overcome the above problems by burning waste wood in a furnace which produces a minimum of entrained solid particles and wherein the products of combustion are blended with measured quantities of ambient air to bring the temperature down to a desired range, wherein the entrained solid particles are stationarily suspended in the stream of combustion products to effect the consumption thereof by burning, the temperature of the blended combustion products being sufficiently high to effect such consumption with the aid of the oxygen in the measured quantities of ambient air.

Brief description of drawings

FIG. 1 is a plan view of an apparatus embodying the concepts of the present invention with parts broken away for convenience in illustration;

FIG. 2 is an enlarged fragmentary perspective view of a damper of the apparatus;

FIG. 2a is a perspective view of one of the air control means of FIG. 1;

FIG. 3 is an elevational view of the apparatus taken in the direction of the arrows 3—3 of FIG. 1, with parts broken away for convenience in illustration;

FIG. 4 is a horizontal section taken along line 4—4 of FIG. 3;

FIG. 5 is an elevational view of the apparatus taken in the direction of the arrows 5—5 in FIG. 1;

FIG. 6 is an enlarged fragmentary view of the stack damper.

Referring particularly to FIGS. 1, 4 and 5, there is a furnace generally indicated at 11. For convenience in illustration, only the refractory wall of the furnace is shown, although it will be appreciated that there is a steel framework supporting certain of the refractory walls. Only fragments of this framework are disclosed and are indicated by the indicia FW.

The furnace 11 includes one or more fuel cells 13, only one being shown in the form of the invention disclosed. This fuel cell can be of the type disclosed in my co-pending application entitled "Fuel Cell," Ser. No. 490,562, filed Sept. 27, 1965, now United States Patent No. 3,330,259, issued July 7, 1967. Since the details of the fuel cell are disclosed in such application, it is deemed unnecessary to disclose them here. Suffice it to say that a forced draft fan F drives air into the fuel cell at several places including at the lower end thereof through a grate structure which is only diagrammatically shown at 15. Waste wood fuel, such as sawdust, wood shavings, hog chips, and the like is fed into the fuel cell through a fuel chute 19 (FIG. 1) diagrammatically disclosed in FIG. 3. Above the fuel cell 13 is a combustion chamber 21 (FIG. 3) within which the products of combustion swirl and from which such combustion products can pass (1) upwardly over a bridge wall 22 to the ambient air through a main outlet stack 23, when a top stack damper 25 thereof is open or (2) pass downwardly into a drop-out chamber 26 and then to ductwork D when the stack damper is closed and the ductwork fan 27 is operating. Thus, when the stack damper 25 is open and the fan 27 inoperative the furnace operates as a conventional furnace, but, when the damper is closed, and the fan 27 is in operation, the products of combustion are drawn into the blending duct D from drop-out chamber through plural openings 29 toward a drying kiln, not shown.

The blending duct D is in part lined with refractory material 33 as is evident from FIG. 1, the refractory material being encased in a steel or sheet metal sheath 35 defining the exterior of the blending duct. The sheath 35 extends toward the fan 27 as shown in FIG. 1, and the refractory lining 33 extends along the sheath 35 to a point just short of a pair of firescreens, a coarse screen 41 and a fine screen 41' which span the interior of the sheath 35. The screens can be replaced or cleaned by removing them through vertical slots 41a formed in the sheath 35.

There is a damper 42 (FIG. 1) for the blending duct and a set of cold air open-ended bleeder tubes 43 in the top of the blending duct, it being evident from FIG. 4 that the top wall of the sheath 35 is not protected by the refractory material as are the sides and bottom walls.

The damper 42 includes a rectangular frame 42a (FIG. 2) surrounding an opening 42b in the end of the duct D. A damper plate 42c has holes through which stand off stud bolts 42d project. A nut 42e on each bolt locates the plate 42c and latches 42f on the plates lock the plate on the bolts at the location of the nuts. Adjustment of the position of the damper plate is obvious. The damper is located below the tubes 43 so it does not control the cold air which passes through the tubes.

The damper 42 enables measured amounts of ambient air to flow into the blending duct where such air is blended with the products of combustion (passing into the blending duct through the plural openings 29) the ambient air serving to reduce the temperature of the products of combustion somewhat to a range, say, of 400° to 1,000° F. As the blended stream of combustion products pass the firescreens 41 and 41' the solid particles (such as charcoal) unavoidably entrained in the combustion products are caught by the screens 41 and 41' and consumed (burned up) on the firescreens. The oxygen added by the ambient air supplied through damper 42 aids in such consumption.

At the end of the sheath 35 remote from the furnace 11, the sheath is connected to the housing 44 of the fan 27, the fan being driven by a motor 45 so as to pull or draw the products of combustion from the drop-out chamber 26 through the openings 29 into the blending duct D, and through the blending duct and firescreens 41 and 41' into the fan housing. From the fan housing the products of combustion are discharged through a ground duct 47 (FIG. 5) into plural outlet ducts 49 (FIGS. 1 and 5) which lead to different portions of a kiln (not shown) to uniformly distribute the hot gases therein.

Additional air can be supplied to the products of combustion through another damper which includes a fixed slotted plate 51 and a movable slotted plate 52 which is adjustable relative to the fixed plate to regulate the amount of additional air which is supplied.

A dump stack 53 (FIG. 5) extends upwardly from the ground duct 47, and a pair of scoops 55 pivotally mounted in a scoop member 57 and operated by a hydraulic cylinder (not shown) through a reversing valve (not shown) can divert part or all of the products of combustion into the dump stack whereby to regulate the temperature of the blended products of combustion passing to the kiln. If the scoops 55 are fully open, substantially all of the combustion gases exit through the dump stack.

It is pointed out that those burnable particles not caught and consumed on the screens 41 and 41' will to a large measure be consumed in the stream of combustion products as said stream travels from said screens toward the kiln, but another screen 65 (FIG. 5) is provided in the ground duct to catch entrained solids.

Referring to FIGS. 4 and 5, the ground duct 47 has a tangential outlet wall at 71. There is a strip or blade at 73 which is above the level of the discharge end of the outlet wall 71 so as to strip off the outer layer of blended products of combustion discharged by the fan 27 so that any dirt or other unburnable solid particles entrained in the air and burnable solid particles which are not consumed on the firescreens 41 and 41' would be thrown by centrifugal force against the wall 71 and stripped off into a pit 75 from which such solid particles will exit through a small constantly open exit stack 77 (FIG. 4).

Typically, the products of combustion passing through the plural openings 29 into the blending duct are at a temperature of between 1,000° and 1,800° F., whereas the ambient air will be around 74° F., sufficient ambient air being introduced to drop the temperature of the products of combustion to somewhere between 400° and 1,000° F. At the time the air leaves the fan housing, the air will be at a temperature of from 180° to 900° F., the air then being directed through the outlet ducts to the associated kiln for drying purposes. If further cooling of the air is desired as it leaves the firescreens, the damper 50 can be used for this purpose.

Having described the invention in what is considered to be the preferred embodiment thereof, it is desired that it be understood that the invention is not to be limited other than by the provisions of the following claims.

I claim:
1. A direct fired drying apparatus comprising:
furnace means providing a first chamber for preliminary or primary combustion of particled cellulostic fuel, whereby to produce gaseous products of combustion having some unburned particles entrained therein,
said furnace means providing another chamber in communication with said first chamber and in which secondary combustion occurs,
said furnace means having an outlet stack communicating at one end with said other chamber and at its other end with the ambient air,
means for selectively opening said exhaust stack for the discharge of said gaseous products to the ambient air, or closing said exhaust stack to preclude such discharge,
blending duct means in communication with said another chamber and into which said gaseous products can travel when said exhaust stack is closed, said blending duct means directing said gaseous products toward a drying zone,
first fan means for injecting air into said first chamber to create a positive pressure in said furnace means to force said gaseous products out through said exhaust stack when the stack is open, or to force said gaseous products toward said blending duct means when said exhaust stack is closed,
said blending duct means having a horizontal portion,
grate means spanning said blending duct means in said horizontal portion,
said grate means being in the form of metal screen means disposed in a vertical plane and operable to catch entrained solid particles and hold them whereby they are consumed by the heat of the gaseous products passing thereby,
said blending duct means having an ambient air inlet upstream of said grate means for the introduction of ambient air into said blending duct means whereby to lower the temperature of said gaseous products,
and second fan means downstream of said grate means for creating a negative pressure in said blending duct means whereby when said exhaust stack is closed said first fan means and said second fan means act in push-pull fashion to cause travel of said gaseous products through said furnace means and said blending duct means toward said drying zone.

2. An apparatus as set forth in claim 1 in which said duct means has slot means formed therein permitting removal, cleaning and reinsertion or replacement of said metal screen means.

3. An apparatus as set forth in claim 1 in which there is a dump stack downstream of said second fan means and valve means for said dump stack for selectively opening and closing the same.

References Cited

UNITED STATES PATENTS

| | | | |
|---|---|---|---|
| 526,524 | 9/1894 | Giesler | 263—19 |
| 1,301,324 | 4/1919 | Schlatter | 263—19 |
| 1,600,762 | 9/1926 | Hawley | 110—119 |
| 1,832,151 | 11/1931 | Stein | 263—19 |
| 2,139,760 | 12/1938 | Losche | 263—19 |

JAMES W. WESTHAVER, *Primary Examiner.*

U.S. Cl. X.R.

110—7, 119